J. TRISTRAM.

Improvement in Seeding-Machines.

No. 130,607. Patented Aug. 20, 1872.

Witnesses.
W. H. Price
A. F. Cornell

Inventor.
J. Tristram
Per Burridge & Co
Atty's

2 Sheets--Sheet 2.

J. TRISTRAM.

Improvement in Seeding-Machines.

No. 130,607. Patented Aug. 20, 1872.

Witnesses.
W. H. Price
A. F. Cornell.

Inventor.
J. Tristram.
Per. Burridge & Co.
Atty's.

UNITED STATES PATENT OFFICE.

JOHN TRISTRAM, OF CLEVELAND, OHIO.

IMPROVEMENT IN SEEDING-MACHINES.

Specification forming part of Letters Patent No. 130,607, dated August 20, 1872.

*To all whom it may concern:*

Be it known that I, JOHN TRISTRAM, of Cleveland, in the county of Cuyahoga and State of Ohio, have invented a certain new and Improved Seeding-Machine; and I do hereby declare that the following is a full, clear, and complete description thereof, reference being had to the accompanying drawing making part of the same.

Figure 1:
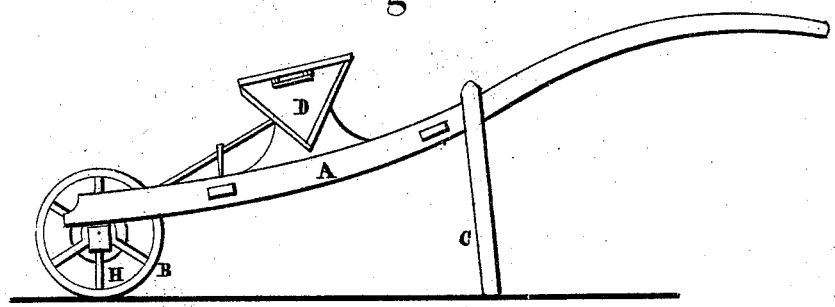
Figure 2:
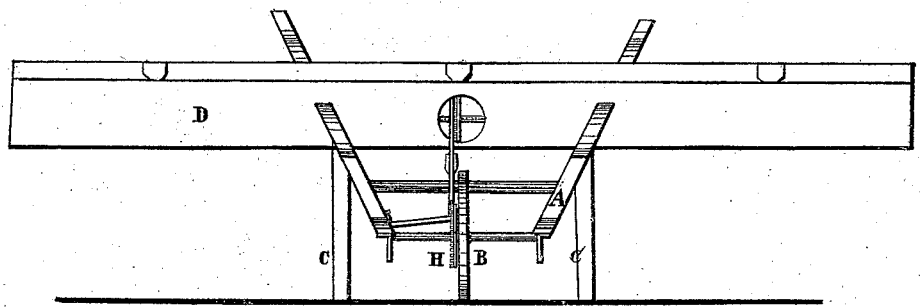
Figure 3:
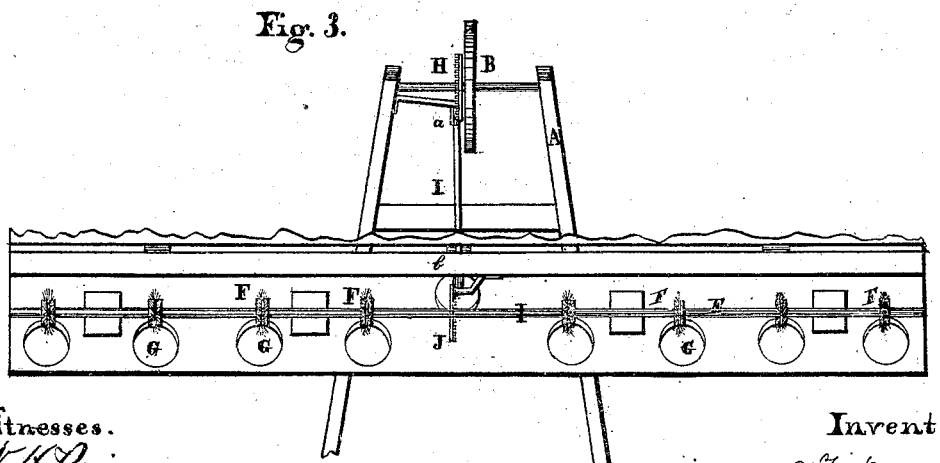
Figure 4:
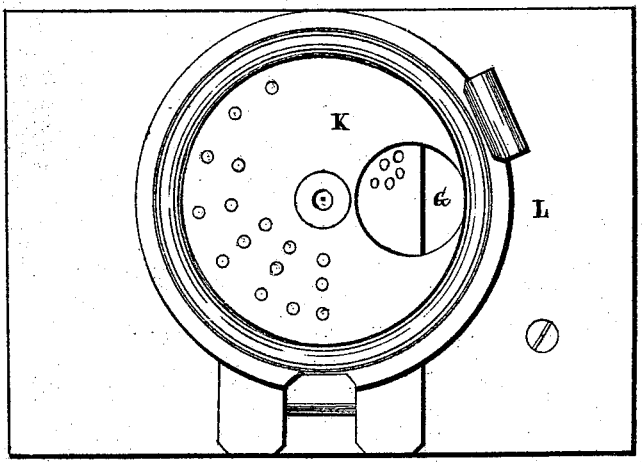
Figure 5:
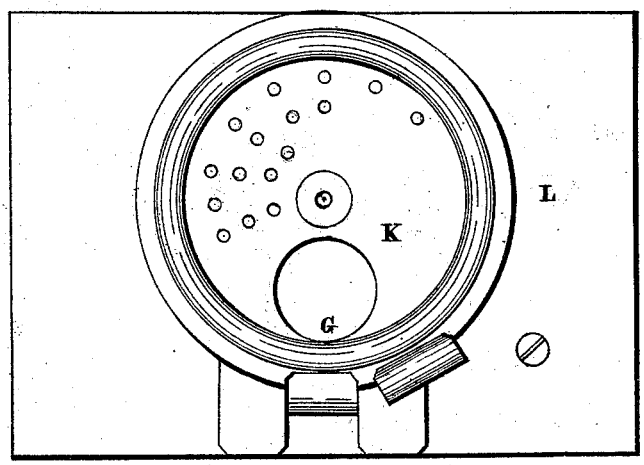

Figure 1 is a side view of the machine. Fig. 2 is a front view. Fig. 3 is a plan view. Figs. 4 and 5 are enlarged views of detached sections.

Like letters of reference refer to like parts in the several views.

SPECIFICATION.

The nature of this invention relates to a seeding-machine, and the object of the invention is to sow the seed broadcast by the use of a hopper, in which the seed is placed, and from which it is discharged through openings in the side of the hopper, and regulated as to quantity by a perforated slide covering the said openings. Said machine is driven by hand and runs upon a single wheel, and which wheel operates an agitator in the hopper.

A more full and complete description of the seeding-machine is as follows:

In the drawing, Figure 1, A represents a frame, the front end of which is mounted upon a wheel, B, whereas the rear end is supported on legs C. Transversely across the frame is secured a seed-box or hopper, D. Lengthwise in said box is journaled a shaft, E, Fig. 3, having secured thereon a series of brushes or agitators, F, corresponding in number and position to the openings G in the side of the hopper, and through which the seed therein is cast out. Motion is given to the shaft referred to by a cog-wheel, H, secured to the side of the wheel B, and which is put in combination with the shaft E by a shaft, I, having on one end thereof a pinion, *a*, which engages the wheel H, and on the opposite end a pinion, *b*, made to engage a wheel, J, Fig. 3, secured to a shaft, E.

The openings G, as above said, are closed by a revolving slide, K, Figs. 4 and 5. Said figures represent an enlarged view of a detached section. In other words, it represents a full-size slide. L shows a section of the side of the hopper. Fig. 4 represents the opening G as closed, and Fig. 5 shows it as being open.

It will be observed that the slide is perforated with a number of holes, *c*, the purpose of which will presently be shown.

Having described the construction and arrangement of the machine, the practical operation of the same is as follows: The machine is intended for sowing small seeds, as grass-seed, &c., and which is done by putting it in the hopper D. The slides K are now turned so as to bring some of the perforations over the openings G, as shown in Fig. 4. The operator holds the machine by the handles and trundles it along before him. As it moves forward the agitators or brushes F referred to revolve by means above described, and sweep the seed against the inside of the slides and through the perforations to the ground in front of the operator. The arrangement of the perforations are such as to cause the seed in passing through them to spread over the ground, and the amount thus driven out by the brushes is regulated by the number of perforations adjusted over the openings; hence the seed can be sown more or less thickly, as may be required. The large hole in the slides is for the purpose of cleaning out the box by the removal of all the seed that may be therein.

By the use of this machine the seed is broadcast evenly over the ground, and requiring but little labor and skill to operate it.

Claim.

What I claim, and desire to secure by Letters Patent, is—

The frame A, seed-box or hopper D, and perforated revolving slides K, in combination with the shaft E, brushes or agitators F, shaft I, and wheels H B, all constructed and arranged to operate in the manner as described, and for the purpose specified.

JOHN TRISTRAM.

Witnesses:
W. H. BURRIDGE,
A. F. CORNELL.